UNITED STATES PATENT OFFICE.

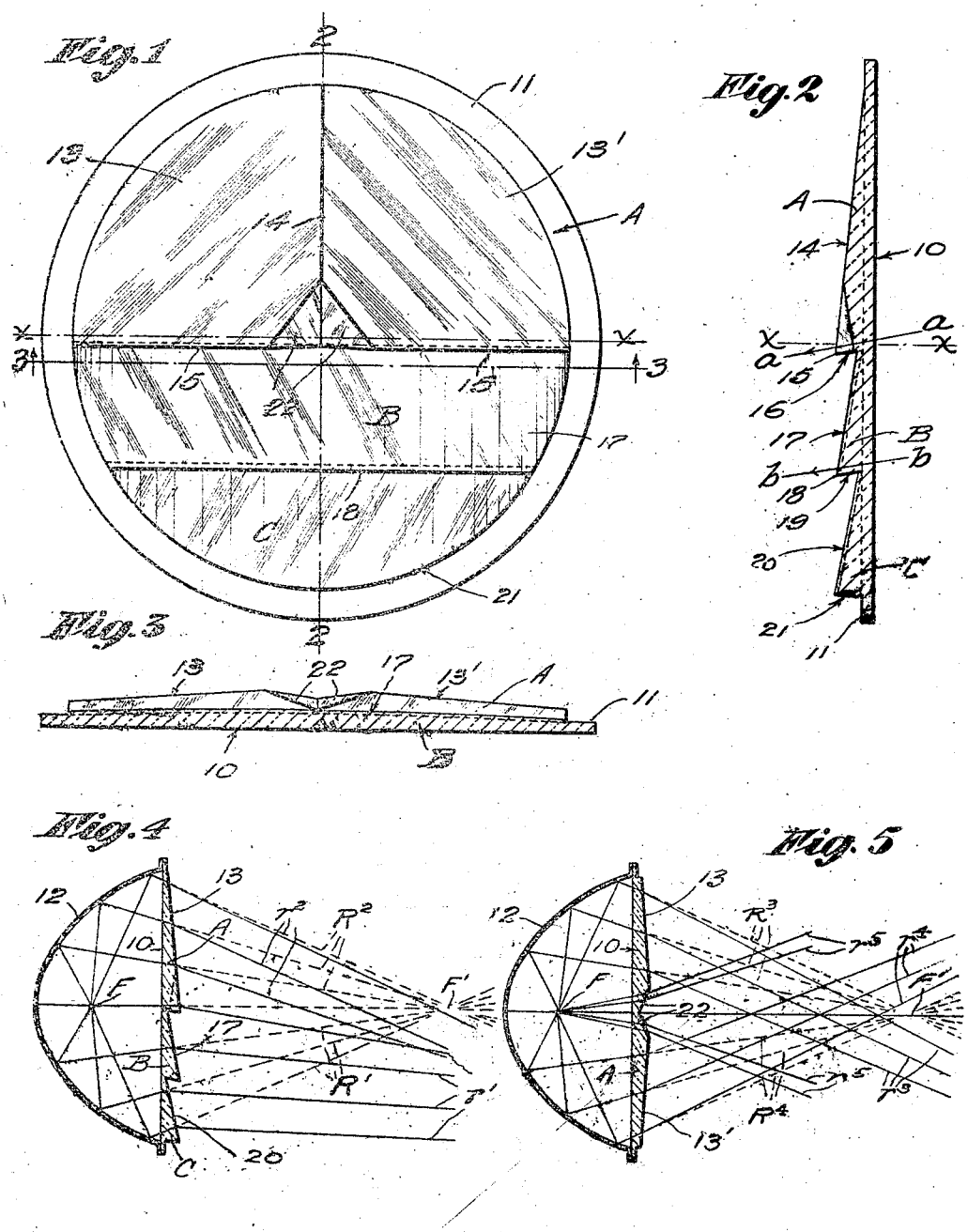

DONOVAN FOSTER, OF SEATTLE, WASHINGTON, ASSIGNOR TO FOSTER DEVELOPMENT CO., OF SEATTLE, WASHINGTON, A CORPORATION OF WASHINGTON.

HEADLIGHT-LENS.

1,321,787.  Specification of Letters Patent.  Patented Nov. 11, 1919.

Application filed April 23, 1917. Serial No. 163,850.

*To all whom it may concern:*

Be it known that I, DONOVAN FOSTER, a citizen of the United States, residing at Seattle, in the county of King and State of Washington, have invented certain new and useful Improvements in Headlight-Lenses, of which the following is a specification.

This invention relates to lenses, and has particular reference to the lenses of automobile headlights. The object of my invention is to produce a lens of this character which will refract in a desired general direction, practically all of the light rays from the lamp, and eliminate the glare which is at least a serious inconvenience to pedestrians and others.

In carrying out my invention, I provide a lens having on its outer or front face a plurality of peculiarly formed prisms which coöperatively serve to direct the light rays downwardly and in horizontally diverging directions.

The invention is illustrated in the accompanying drawings, in which—

Figure 1 is a front elevational view of the lens. Figs. 2 and 3 are sectional views taken through 2—2 and 3—3 of Fig. 1. Fig. 4 is a vertical section of a headlight reflector with my improved lens applied thereto, and representing by broken lines the directions of the reflector light rays emanating from the headlight, and by full lines their directions as modified by my improved lens. Fig. 5 is a horizontal section of the device shown in Fig. 4 and in which is illustrated diagrammatically by unbroken and broken lines, respectively, the directions of the light rays with and without the use of my lens.

Referring to the drawings, a lens is desirably formed of a circular shape having a plain back surface 10 and having in front a series of superposed prisms surrounded, preferably, by a peripheral rim portion 11 whereby the lens may be secured to the mouth of a reflector 12 by any usual or suitable fastening devices.

The upper lens prism A is provided in front with two plain surfaces $13$ and $13^1$ extending laterally from a medial vertical plane indicated by line 14, and diverge therefrom in angular relations toward the rear. These prism surfaces $13$—$13^1$, moreover, incline forwardly from top to bottom and make acute angles, as at 15, with the prisms under surface 16 which, as shown, is located slightly below the horizontal axis $x$—$x$ of the lens.

Below the prism A the lens is formed with a number of prisms, two—B and C—being shown. The front surface 17 of the prism B slopes from the rear of the under surface 16 of the prism A to an apex 18 with an under surface 19 and from the rear of the latter the lower prism's front surface 20 slopes forwardly to its apex with the under edge 21. The inclinations of the under surfaces 16 and 19 of prisms A and B correspond to or are substantially parallel with the directions in which the light rays, as indicated by $a$ and $b$, are refracted in passing through the respective prisms so as not to sacrifice any light values due to total reflection by the bases, or under surfaces of the respective prisms.

The surfaces 17 and 20 of the respective prisms B and C may, if desired, be made slightly convex horizontally, as illustrated in Fig. 3 with respect to prism B.

Centrally of the lens the prism A is provided with a notch having triangularly shaped side surfaces 22 arranged in angular relations substantially as shown in Figs. 1 and 3, and arranged to slope rearwardly toward the vertical and horizontal axes of the lens.

In a parabolic reflector, such as usually employed in an automobile headlight, the rays derived from a source of light at the so-called inner focus are directed upwardly by the lower portion of the reflector, as indicated by $R^1$, Fig. 4, while the light rays are by the upper portion of the reflector directed downwardly as indicated by $R^2$, to cross at or about what is conventionally known as the outer focus, indicated by $F^1$, at a short distance in front of the headlight.

Similarly, the rays of light indicated by $R^3$ and $R^4$ in Fig. 5 are reflected toward the left and right, respectively, from the right and left sides of the reflector to cross at or about the aforesaid outer focus $F^1$.

Ordinarily, the rays $R^1$ which are thrown upwardly, are the cause of the objectionable glare in headlights and which, by the present invention, is overcome by the provision of a lens having prismatic elements which afford means to not only cause all of the rays to be directed downwardly, as indicated by $r^1$ and $r^2$ in Fig. 4, but also serve to direct the same laterally as indicated by $r^3$ and $r^4$ in Fig. 5 so that the referred-to outer focus is thereby advanced, resulting in the light being thrown to better illuminate the road and further ahead than hitherto.

Due to the sloping of the front surface of the prism A in two relatively inclined planes 13—$13^1$ and by the provision of laterally convex surfaces 17 and 20 for the other prisms B and C, the rays are furthermore influenced to be spread horizontally and obviate the so-called "spotting."

The reëntrant prism afforded by the triangular surfaces 22 is located directly in front of the focus F, thereby refracting to a greater extent than by the protruding prisms the direct rays from the lamp, and causing such rays to be spread, as indicated by $r^5$ in Fig. 5.

The front surface 13—$13^1$ of the upper prism A is inclined from a vertical plane to a less extent than the front surfaces 17 and 20 of the lower prisms B and C to accordingly afford less refracting power to the upper prism and bending, so to speak, the rays into approximately parallel lines, and obviating any vertical divergence of the light rays above the longitudinal axis of the headlight and in front of the outer focus.

The operation and advantages of the invention will, it is thought, be understood from the foregoing explanation.

What I claim is—

1. A lens having one face formed to provide a series of transverse prisms whose front faces are arranged to refract downwardly all rays passing through the lens and whose under faces are disposed substantially parallel to such refracted rays, said lens having a central notch forming a reëntrant angle to refract all rays passing through the angle in lateral diverging directions.

2. A lens having a surface formed to provide a plurality of transverse prisms adapted to refract downwardly all rays passing through the lens, one of said prisms extending substantially from the top to the center of the lens, the front face of said prism being formed in two vertical planes arranged in angular relations with each other and also sloping forwardly from the top to the bottom, the under face of said prism being inclined downwardly and forwardly from its juncture with the front face of the adjacent prism.

3. A lens having one face formed with a series of protruding transverse prisms adapted to refract all light rays passing through the lens in a downward direction, said face of the lens being provided with a central notch formed of two triangular plane surfaces arranged to refract the rays of light passing through the lens directly from a lamp in lateral diverging directions.

4. A lens having a face provided with a plurality of transverse prismatic projections adapted to refract downwardly all rays of light passing through the lens, and a notch formed of two angular plane surfaces arranged substantially centrally in the lens to refract all rays passing through the angle directly from a light source in lateral diverging directions.

5. A lens having its front surface formed with a prismatic projecting portion of substantially one-half the area of the lens, a notch provided in said projecting portion at the center of the lower edge thereof, the front faces of said projecting portion and of the notch being arranged to refract the rays passing through the lens in downward and lateral directions.

6. A lens having one face formed to provide a series of transverse prisms whose front faces are arranged to refract downwardly all rays passing through the lens; said lens having a reëntrant notch formed substantially centrally therein to refract all rays passing through the angle directly from a light source in lateral diverging directions.

Signed at Seattle, Washington, this 14th day of April 1917.

DONOVAN FOSTER.